(12) United States Patent
Schulz et al.

(10) Patent No.: US 12,362,912 B2
(45) Date of Patent: Jul. 15, 2025

(54) SECURE PROVISIONING OF DEVICES IN INDUSTRIAL AUTOMATION SYSTEMS

(71) Applicant: ABB Schweiz AG, Baden (CH)

(72) Inventors: Dirk Schulz, Meckenheim (DE); Soeren Finster, Karlsruhe (DE); Sten Gruener, Laudenbach (DE); Thomas Gamer, Brühl (DE)

(73) Assignee: ABB Schweiz AG, Baden (CH)

( * ) Notice: Subject to any disclaimer, the term of this patent is extended or adjusted under 35 U.S.C. 154(b) by 210 days.

(21) Appl. No.: 17/974,693

(22) Filed: Oct. 27, 2022

(65) Prior Publication Data
US 2023/0125527 A1  Apr. 27, 2023

(30) Foreign Application Priority Data

Oct. 27, 2021 (EP) .................................... 21205053

(51) Int. Cl.
*H04L 9/08* (2006.01)
*H04L 9/40* (2022.01)

(52) U.S. Cl.
CPC ........ *H04L 9/0816* (2013.01); *H04L 63/0428* (2013.01)

(58) Field of Classification Search
CPC .......................... H04L 9/0816; H04L 63/0428
See application file for complete search history.

(56) References Cited

U.S. PATENT DOCUMENTS

| | | | |
|---|---|---|---|
| 2020/0103858 A1* | 4/2020 | SayyarRodsari | ... H04L 63/0428 |
| 2020/0275273 A1* | 8/2020 | Smith | ................... H04W 12/50 |
| 2022/0255756 A1* | 8/2022 | Blate | ..................... H04L 9/3247 |

OTHER PUBLICATIONS

European Patent Office, Extended European Search Report in European Patent Application No. 21205053.8, 8 pp. (Mar. 9, 2022).

* cited by examiner

*Primary Examiner* — Frantz B Jean
(74) *Attorney, Agent, or Firm* — Leydig, Voit & Mayer, Ltd.

(57) ABSTRACT

A method for securely supplying data to be used in parameterizing a device for an industrial automation system includes a first party supplying a second party with a machine-readable standardized container for the exchange of device parameters in industrial automation systems, wherein the supplying comprises writing into the container an encrypted primary security credential to be used by the device for establishing trust with the industrial automation system. In another aspect, a method for securely obtaining data to be used in parameterizing a device for an industrial automation system includes obtaining, from a first party, by a second party, a machine-readable standardized container for the exchange of device parameters in industrial automation systems, the container comprising an encrypted primary security credential to be used by the device for establishing trust with the industrial automation system.

12 Claims, 6 Drawing Sheets

SECURE PROVISIONING OF DEVICES IN INDUSTRIAL AUTOMATION SYSTEMS

CROSS-REFERENCE TO RELATED APPLICATIONS

This patent application claims priority to European Patent Application No. 21205053.8, filed on Oct. 27, 2021, which is incorporated herein in its entirety by reference.

FIELD OF THE DISCLOSURE

The present disclosure relates to the secure provisioning of devices in industrial automation systems.

BACKGROUND OF THE INVENTION

When a device is to be securely connected to an industrial automation system, there is a need to exchange authentication information between the device and system prior to first connection. There are two principal ways to do this: in a plant workshop scenario; or in a vendor manufacturing scenario. In the plant workshop scenario, the un-configured device is connected to a device management function of the industrial automation system for the device to be parameterized, including the transfer of security-sensitive data. This is a time-consuming and costly job for the plant owner and is preferably avoided, even if security credentials, permanent identifiers, or public keys can be transferred securely during the process (which is not necessarily possible). In the vendor manufacturing scenario, the vendor receives device parameter lists including security-sensitive data with the order from the plant operator and pre-parameterizes the device as part of the manufacturing process. The device can then be used securely by the industrial automation system without any further manual work.

Pre-parameterization of the device thus requires the exchange of security-sensitive data between the plant operator and the vendor. There is currently no satisfactory way in the state of the art to protect the security-sensitive data against manipulation, eavesdropping and forgery as it is exchanged from device engineering, through ordering, to manufacturing.

BRIEF SUMMARY OF THE INVENTION

According to a first aspect, the present disclosure describes a method for securely supplying data to be used in parameterizing a device for an industrial automation system, the method comprising a first party supplying a second party with a machine-readable standardized container for the exchange of device parameters in industrial automation systems, wherein the supplying comprises writing into the container an encrypted primary security credential to be used by the device for establishing trust with the industrial automation system.

The "first party" may comprise for example an operator owner of the industrial automation system, and/or a customer of the device, or any other authorised entity supplying data for the device on behalf of the operator or customer. As the party supplying data for parameterizing the device, e.g., configuration data, the first party may alternatively be referred to as the "configurer" or "data supplier." The "second party" may comprise for example the vendor or manufacturer of the device, or any other authorised entity which parameterizes the device with the supplied data on behalf of the first party, e.g., an on-boarding platform, a supply-chain partner, a distributor, or a contractor. As the party receiving the data for parameterizing the device, the second party may alternatively be referred to as the "parameterizer," "provisioner," or "data receiver/user/consumer." In some examples, however, the first party may be e.g. the vendor who generates the primary security credential and transmits it to e.g. the operator as the second party. This scenario may be referred to herein as a reverse scenario. For example, the plant owner may order a device using the container, specifying the device type optionally with some device parameter values, where after the vendor generates the primary security credential and transfers it back to the plant owner.

Furthermore, according to a second aspect, there is provided a method for securely obtaining data to be used in parameterizing a device for an industrial automation system, the method comprising obtaining, from a first party, by a second party, a machine-readable standardized container for the exchange of device properties in industrial automation systems, the container comprising an encrypted primary security credential to be used by the device for establishing trust with the industrial automation system.

In the first and/or second aspect, the first party may write data into the container locally and/or remotely.

By "local writing of data" is meant that the first party may write the primary security credential into the container using a secure local work environment, before supplying the second party with the container by transmitting the container to the second party over a public or private network. For example, the first party may generate and/or edit the container using a private computing network in the secure local work environment and subsequently transmit the generated/edited container to the second party over the public network. Similarly, obtaining the container from the first party in the second aspect may comprise the second party receiving the transmitted container from the first party over the public or private network, wherein the container as received already comprises at least the primary security credential written into the container. An example of the local writing of data is described with reference to the 'on-order configuration' embodiment described herein.

By "remote writing of data" is meant that the first party may write the primary security credential into the container by using a secondary security credential received from the second party to establish a secure channel to a remote work environment of the second party in which the container is stored, before writing the primary security credential into the container stored in the remote work environment. For example, the first party may use a public network to access a remote server, e.g. the second party's server, to generate and/or edit and/or store the container there. Similarly, the obtaining step of the second aspect may comprise the second party transmitting to the first party a secondary security credential which can be used by the first party to establish a secure channel to a remote work environment of the second party in which the container is stored, and permitting the first party to write the primary security credential into the container stored in the remote work environment. An example of the remote writing of data is described with reference to the 'post-order configuration' embodiment described herein.

The distinction between "local" and "remote" may be understood in terms of the information transmitted over the public network: in local writing of data, only the completed or modified container is transmitted, whereas, in remote writing of data, it is the data for insertion into the container that is transmitted. It will furthermore be understood that the writing of data into the container may be performed partially locally and partially remotely.

In order to establish the secure channel, the secondary security credential may be transmitted from the second party to the first party in the first or second aspect by the second party embedding the secondary security credential in the said container and transmitting the container to the first party. Alternatively, the secondary security credential may be transmitted from the second party to the first party embedded in a further such container, different to the said container comprising the primary security credential. In any case, the secondary security credential may comprise for example a public key with which the primary security credential is encrypted. The public key may correspond to a private key which is generated by the device, or otherwise generated for the device and kept secret by the device. Alternative methods of establishing the secure channel will of course be apparent to the person skilled in the art.

Accordingly, there is provided in a third aspect a method of establishing a secure channel for the exchange of a primary security credential, the method comprising transmitting, to a first party from a second party, a secondary security credential embedded in a container as described herein. The primary security credential may then be exchanged using the method of one or both of the first and second aspects.

In any of the aforesaid aspects, the container as supplied by the first party or obtained by the second party may comprise further device parameters for parameterizing the device. The method of any of the aforesaid aspects may further comprise steps for parameterizing the device using the supplied device parameters. Methods for parameterizing the device using the supplied device parameters will now be set forth.

According to a fourth aspect, there is provided a method for parameterizing a device for an industrial automation system, the method comprising obtaining a machine-readable standardized container for the exchange of device properties in industrial automation systems, the container comprising an encrypted primary security credential to be used by the device for establishing trust with the industrial automation system, along with further device parameters for parameterizing the device; and parameterizing the device using the device parameters from the container, wherein the parameterizing comprises the device extracting the primary security credential from the container and decrypting the primary security credential.

The container may be obtained using the method of the second aspect, for example. The device may be parameterized locally and/or remotely.

By "local parameterization" is meant that the parameterizing may be performed locally by downloading the container to the device from a secure local work environment in which the container is stored. For example, the device and container may be connected to the same private network, i.e. the container is downloaded from its stored location to the device only via a private network without any transmission over a public network. An example of local parameterization is described with reference to the 'on-order configuration' embodiment described herein.

By "remote parameterization" is meant that the parameterizing may be performed remotely by accessing a remote work environment in which the container is stored, and downloading the container to the device from the remote work environment. For example, the container may be downloaded to the device over at least one public network. An example of remote parameterization is described with reference to the 'post-order configuration' embodiment described herein. Using remote parameterization, the device itself may access the remote work environment according to predefined power-on behaviour programmed into the device. The predefined power-on behaviour may be input to the device by way of the said container.

The distinction between local and remote parameterization may be understood in terms of the time point at which, and the manner in which, the device is 'flashed' to include the container, or at least part thereof, in memory, e.g. on production or on commissioning. Using local parameterization, a secure way of 'pre-parameterizing' or 'preconfiguring' the device (i.e., parameterizing it in a vendor/manufacturing environment) is provided. Using remote parameterization, more flexibility is gained regarding the time point at which the device downloads the container. It is furthermore possible that the parameterization may be performed partially locally and partially remotely.

Secure writing of the primary security credential into the container is thus performed by the first party encrypting the primary security credential before transmission. In further examples, secure writing of data into the container may be enhanced by one or more of the following techniques: encrypting a security sub model containing the primary security credential before transmission; encrypting the container containing the primary credential before transmission; using a secure protocol for data exchange; or any other appropriate technique for providing secure data exchange.

Similarly, secure parameterization of the device using the container may comprise any one or more of the following techniques: receiving an encrypted security sub model containing the primary security credential and decrypting the security sub model; receiving an encrypted container containing the primary security credential and decrypting the container; using a secure protocol for data exchange; or any other appropriate technique for providing secure data exchange.

Steps may be taken for establishing trust between the first and second parties and/or between either or both of those parties and the device. Steps may be taken to exchange cryptographic material, for example symmetric or asymmetric keys, to exchange credentials or login details for remote server access, and/or to establish communications using a secure protocol. In one example, the device is manufactured with a hardware security module configured to generate a private key, which is retained in the module, along with a public key, which is shared with the first party for providing the device with encrypted data (including the primary security credential). In another example, the device is manufactured to include credentials stored thereon which will be used by the device to establish communications using a secure protocol with a remote server for downloading the container.

It will be understood that any such secure channel, once established, may be used to set up further secure channels. For example, login details may be encrypted, or communications using a secure protocol may be used to exchange keys, and so on.

Steps may be taken to ensure that the configuration data is to be provided to the correct device, particularly when the device is not yet manufactured or is yet to be selected from a stock of such devices.

DETAILED DESCRIPTION OF THE INVENTION

Mutual authentication of devices and industrial automation systems is a key requirement, particularly when using cloud and edge environments, converged IP-based networks running over TSN, APL, 5G, or other cellular technologies. To establish the necessary trust between a device and an industrial automation system, secure identity information must be exchanged between the device vendor and plant operator prior to the first connection of the device. Described herein are systems and methods for the secure provisioning of security credentials to a device from an industrial system intending to use the device.

Figure 1:
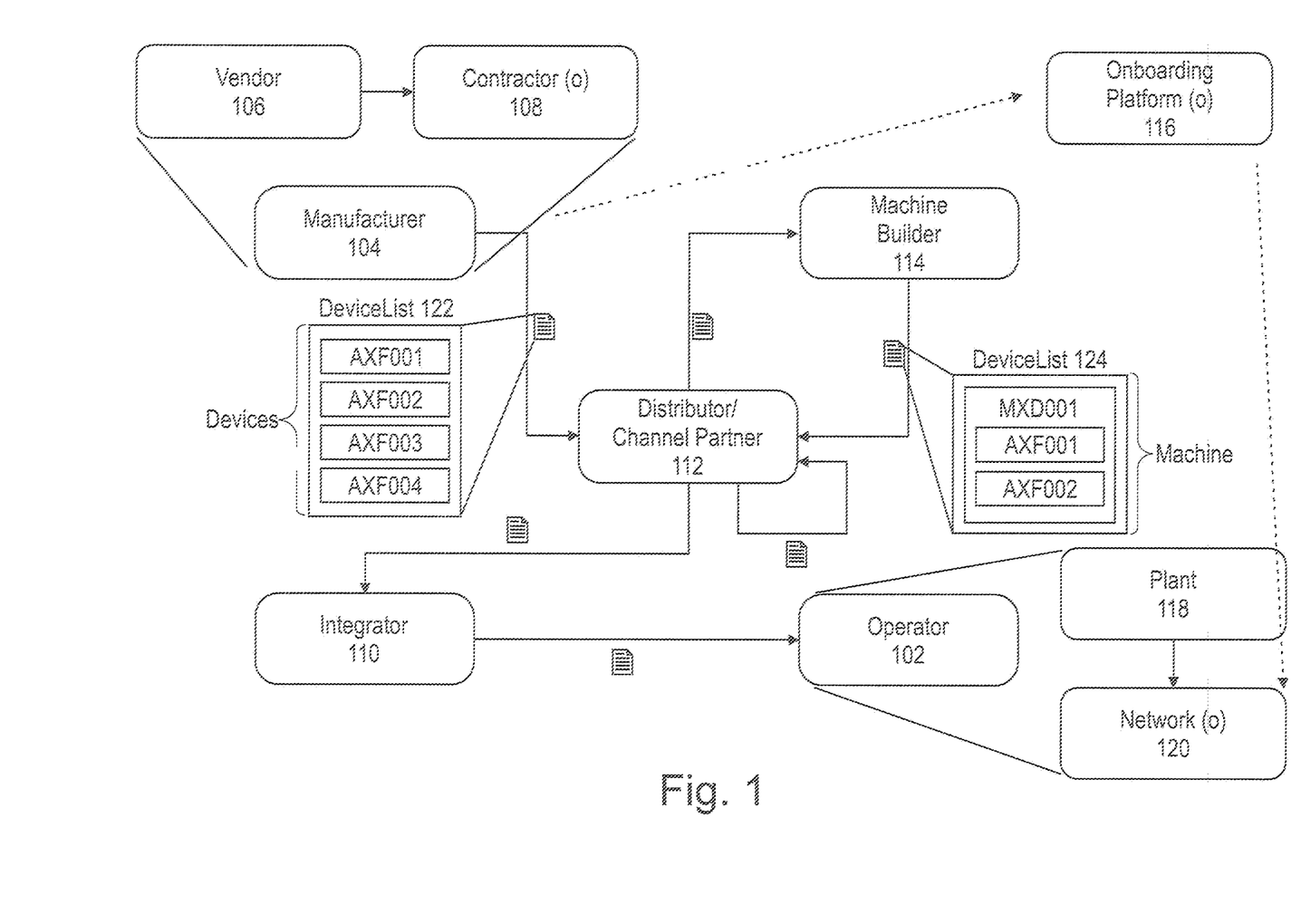
FIG. 1 is a block diagram of the flow of data between a series of parties involved in the delivery of devices ordered by a plant operator in accordance with the disclosure.

FIG. 1 illustrates a typical flow of data between a series of parties involved in the delivery of devices ordered by a plant operator 102. The manufacturer 104, who may be a vendor 106 (possibly using one or more subcontractors 108), supplies the devices to a distributor 112, who may optionally provide the devices to an integrator 110 for integration into the plant 118, and/or to a machine builder 114, who incorporates one or more of the devices into a larger machine before integration of that machine into the plant 118. The plant operator 102 may furthermore make use of an on-boarding platform 116, which takes device data directly from the manufacturer 104 and which accesses the network 120 of the plant 118 to on-board the devices using that data. At various stages, device data, including device identities, is exchanged, as shown in the device lists 122 and 124. As described above, in a pre-parameterization scenario, the device data may have been pre-provided to the manufacturer 104 by the plant operator 102 and may comprise security-sensitive data, such as device identities. Each exchange of data between parties therefore represents a potential weak point in the security of the data exchange, while each data exchange may take place according to a proprietary communication means or means specifically agreed between the parties (e.g., sending encrypted zip files by email). Handling security of the data exchange is currently therefore prohibitively complex.

According to the present disclosure, a standardized general exchange mechanism for device properties (e.g. an Industrie 4.0 Asset Administration Shell), bearing protocol-specific identity sub models (e.g. derived from 5G-AKA, IEEE 802.1AR, etc. or OPC 10000-21), is combined with encryption and authentication methods (e.g. AEAD using AES, signatures using RSA or ECC) to provide seamless security with vendor and technology agnosticism. A trust relationship between device vendor and customer is presumed to have been established by means of accepting each other's certificate authority (CA) to verify issued certificates. In particular, a container or data artefact based on a standardized device property exchange format (in the following non-limiting examples, an Industrie 4.0 Asset Administration Shell Exchange (AASX) packet) is signed by the device vendor and includes cryptographic material for secure data exchange (e.g., an RSA public key) with the device (e.g., corresponding private key stored in a hardware security module on the device). In one non-limiting example, referred to herein as on-order configuration, the device security configuration is created during the order process. Another non-limiting example, referred to herein as post-order configuration, provides seamless security in case of post-order security configuration needs. Both variants utilize the said container.

Figure 2:
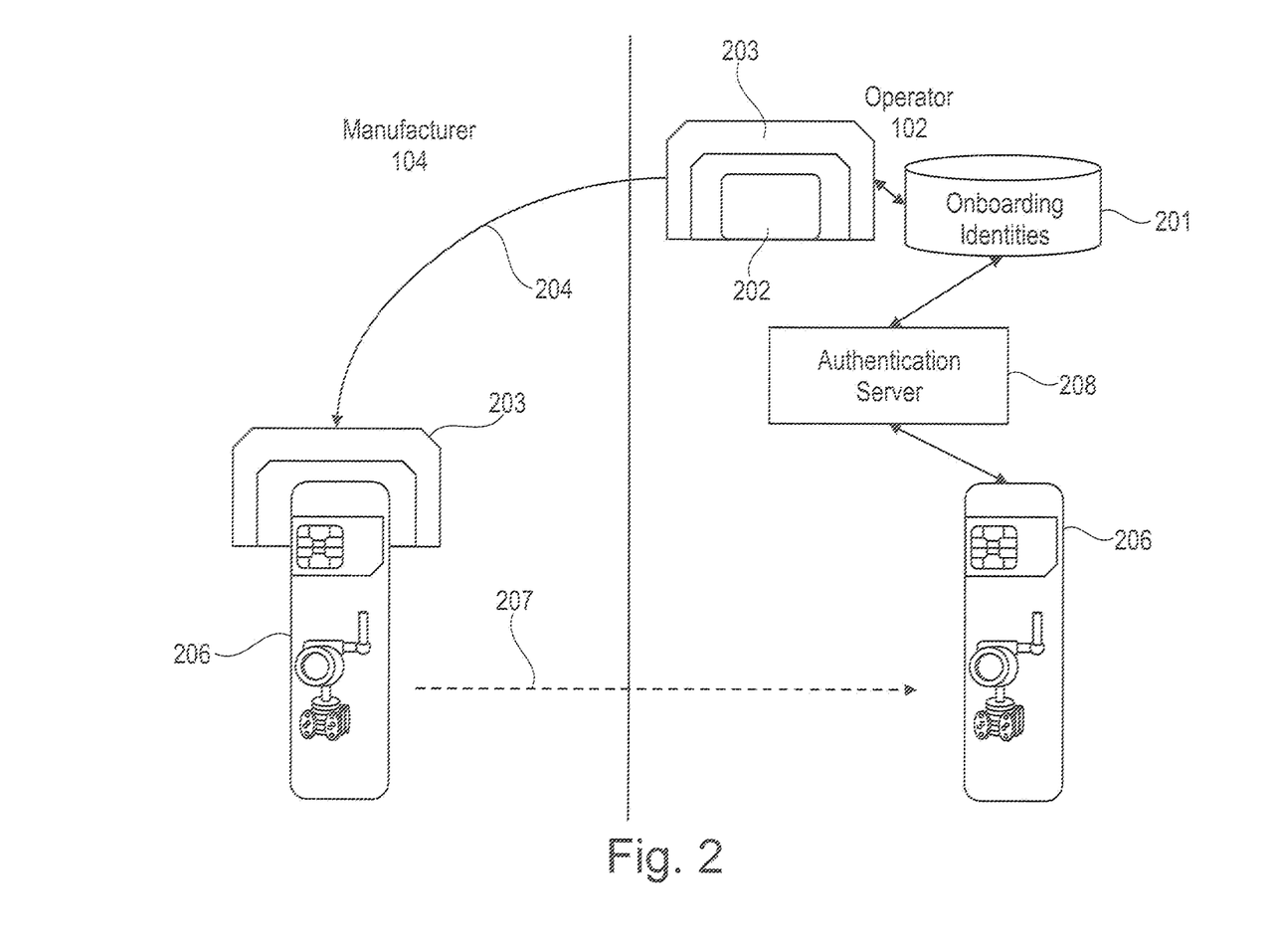
FIG. 2 is a flowchart for a method of securely exchanging configuration data to be used in provisioning a device for an industrial automation system in accordance with the disclosure.

FIG. 2 illustrates an on-order configuration method for securely exchanging configuration data to be used in provisioning a device for an industrial automation system. The method includes the following steps:—

1. The operator 102 selects the device to order with pre-parameterization and obtains a container 203 based on a device property exchange format. In this non-limiting example, the container 203 comprises an Industrie 4.0 Asset Administration Shell Exchange (AASX) packet.

2. The operator 102 generates a security sub model 202 for the device, bearing one or more security credentials including at least a device identity provided by an on-boarding identities database 201 such as a device directory (e.g. an FDI device management tool, a DCS aspect object, an OPC UA GDS, an LDAP server, a 3GPP UDM function, etc.). The operator 102 then encrypts the security sub model 202 using a public key which enables the operator 102 to encrypt information to be provisioned to the device. The public key may be provided as part of the container 203, but may instead be provided separately. In one example, the public key is the public key of the manufacturer 104 or vendor 106. This public key may be imported into a corporate key chain of the operator 102 when setting up a public key infrastructure (PKI). In another example, the public key corresponds to the identity of the device. Trust in that key may be established by signing the container (or parts of it) with a vendor certificate rooted in the vendor CA. This device public key enables security-sensitive data to be stored in, and sent via, the container without the manufacturer 104 or vendor 106 being able to read that data.

3. The operator 102 integrates the security sub model 202 into the container 203. The container 203 may comprise other configuration data for parameterizing the device, for example functional data, stored for example in a device configuration sub model. The device configuration sub model may optionally also be encrypted.

4. The operator 102 transfers the generated container 203 including the encrypted security sub model 202 over a public network such as the internet (e.g. using email, web services, REST-based protocols, etc.) to the manufacturer 104. Security can be further enhanced for example by using a secure protocol and/or by encrypting the entire container 203. Secure download of AASX packages is described for example at https://www.plattformi40.de/PI40/Redaktion/DE/Downloads/Publikation/sicherer_downloadservice.pdf.

5. The manufacturer 104 optionally authenticates the container 203 upon receipt of the order. The container 203 may be signed by the operator 102 using a public PKI that can be verified by the manufacturer 104. This step may alternatively form part of the secure transfer in step 4.

6. The manufacturer 104 manufactures the device 206, downloading the security sub model 202 to the device 206, which decrypts the security sub model 202 using a private key corresponding to the public key, and applies the security sub model 202. The private key may be that which corresponds to the above-mentioned device public key, with the private/public key pair having existed prior to the manufacture of the device 206, e.g., as part of a hardware security module supplied to the manufacturer 104 and subsequently assembled into the device 206. Alternatively, the manufacturer 104 may provide a private/public key pair and forget the private key immediately after the device is outfitted with it.

7. The manufacturer 104 delivers the device 206 to the operator 102 using a public logistics network.

8. The operator 102 installs the device 206, powers it on, and authenticates it with the help of an authentication server 208, using the device identity provided during the pre-parameterization and optionally using the pre-established trust base.

Figure 3:
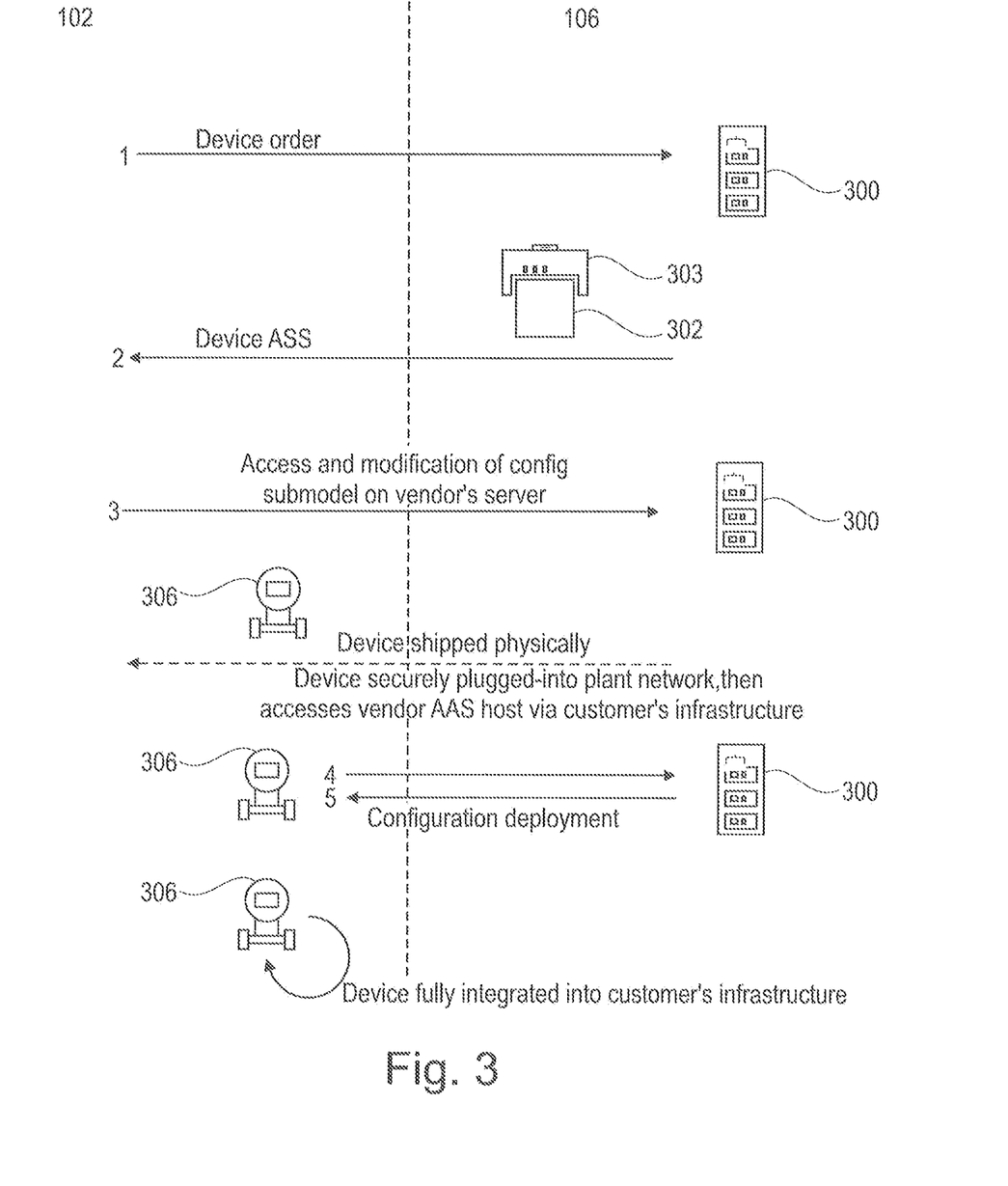
FIG. 3 is a flowchart for another example of a method for securely exchanging configuration data to be used in provisioning a device for an industrial automation system, in accordance with the disclosure.

FIG. 3 illustrates a post-order configuration method for securely exchanging configuration data to be used in provisioning a device for an industrial automation system. In this variant, the device has already been manufactured when the secure exchange of data takes place. The post-order configuration method includes the following steps:—

1. The customer 102 selects the device to order and orders the device from the vendor 106.

2. The vendor 106 sends to the customer 102 an initial container 303 comprising a security sub model 302 including a public key extracted from the device. The public key corresponds to a private key which is known only to the device and which is not extractable The public and private key may be generated for example by a hardware security module of the device during manufacturing. The vendor 106 puts the device public key into the initial container 303 and optionally assures (through their own identity and signature), that this public key is that of the ordered device. The initial container 303 may further comprise a reference to a device configuration sub model hosted on the vendor's server 300. Additionally, the behaviour on power-on of the device may be defined in the initial container 303. In one non-limiting example, the initial container 303 may specify that the device will connect to a device specific SSID using a device specific passphrase. As in the example described above, the container 303 may comprise an AASX packet.

3. The customer 102 accesses the vendor's server 300 remotely. To this end, the customer 102 may use login credentials provided as part of a trust relationship established between the vendor 106 and the customer 102 before the device was manufactured. Alternatively, the plant network 120 may be an open network that allows credential-less (or less secure) access to the vendor's server 300. Using the reference that was provided in the initial container 303, the customer 102 then modifies the device configuration sub model hosted on the vendor's server 300, so as to provide the desired functional configuration data for the device. As in the example described above, the customer 102 obtains the device identity and stores the same in the security sub model 302. The operator 102 then encrypts at least the security sub model 302 using the device public key, and optionally also the device configuration sub model. The device configuration sub model along with the encrypted security sub model 302 are then integrated into a completed container, which may be a new container or an updated version of the initial container 303, and the completed container is stored on the vendor's server 300 to be downloaded later to the device. Alternatively, instead of the operator 102 accessing the vendor's server 300 to modify data stored thereon, the operator 102 may return to the vendor 106 a completed version of the initial container 303 which was used by the vendor 106 to send the security sub model 302 to the customer 102, with the initial container 303 (or a duplicate thereof) having been completed to include the (encrypted) security sub model 302 along with a completed device configuration sub model. In the case that different parties edit the same sub model, version information may be used (such as that which is available in the AAS) so each party can change the values. The completed container (and/or the modified sub model(s)) may then be re-signed. In the case that re-signing of a container or sub model is not permitted, a duplicate of the initial container or sub model may first be made before the duplicate is updated and then signed. Exchange of events between sub models may also be used to handle edits from multiple parties. Alternatively, information may be split into different sub models, for example customer-owned sub model and a vendor-owned sub model, so that there is no need to mix updates from multiple parties.

4. Following shipment of the device 306, the customer 102 commissions the device 306, which includes connecting it to the plant infrastructure.

5. According to the pre-defined power-on behaviour, the device 306 then establishes a secure channel (using e.g. OPC UA) to the vendor's server 300, or to another server whose address is specified and from which the completed container may be downloaded. The device 306 then downloads the completed container and decrypts the security sub model 302 using its private key. Authentication of the device 306 is then performed using the device identity contained in the security sub model 302. In the post-order configuration method, the device 306 is "booted" with the initial container 303 from the vendor 106 (without the additional input from the operator 102). The device 306 then searches for the updated version of the container using the pre-defined power-on behaviour and merges or overwrites the initial container 303 with the new one.

In one variation to the post-order configuration method, the customer 102 creates a secure end-to-end communication to the device 306 using the device identity included in the container 303 and the defined behaviour on power-on. In case the device 306 is already on the customer's premises, for establishing communication, the customer 102 provides a fitting network environment for the device 306, e.g., by automatically configuring a software-defined network using the container 303. This may be implemented using e.g. OPC UA protocol connectivity between the runtime environment interpreting the container 303 and the device 306. To enable such connectivity, the container 303 may be interpreted on the customer's premises using e.g. edge infrastructure. Interpreting the container 303 yields, for example, the device identity, which is used to authenticate the device 306 in the local network (e.g., using 802.1AR)

In a further variation to the post-order configuration method, the customer 102 downloads the completed container 303 from their own server or from the vendor's server 300 and presents it to the device 306 themselves.

Figure 4:
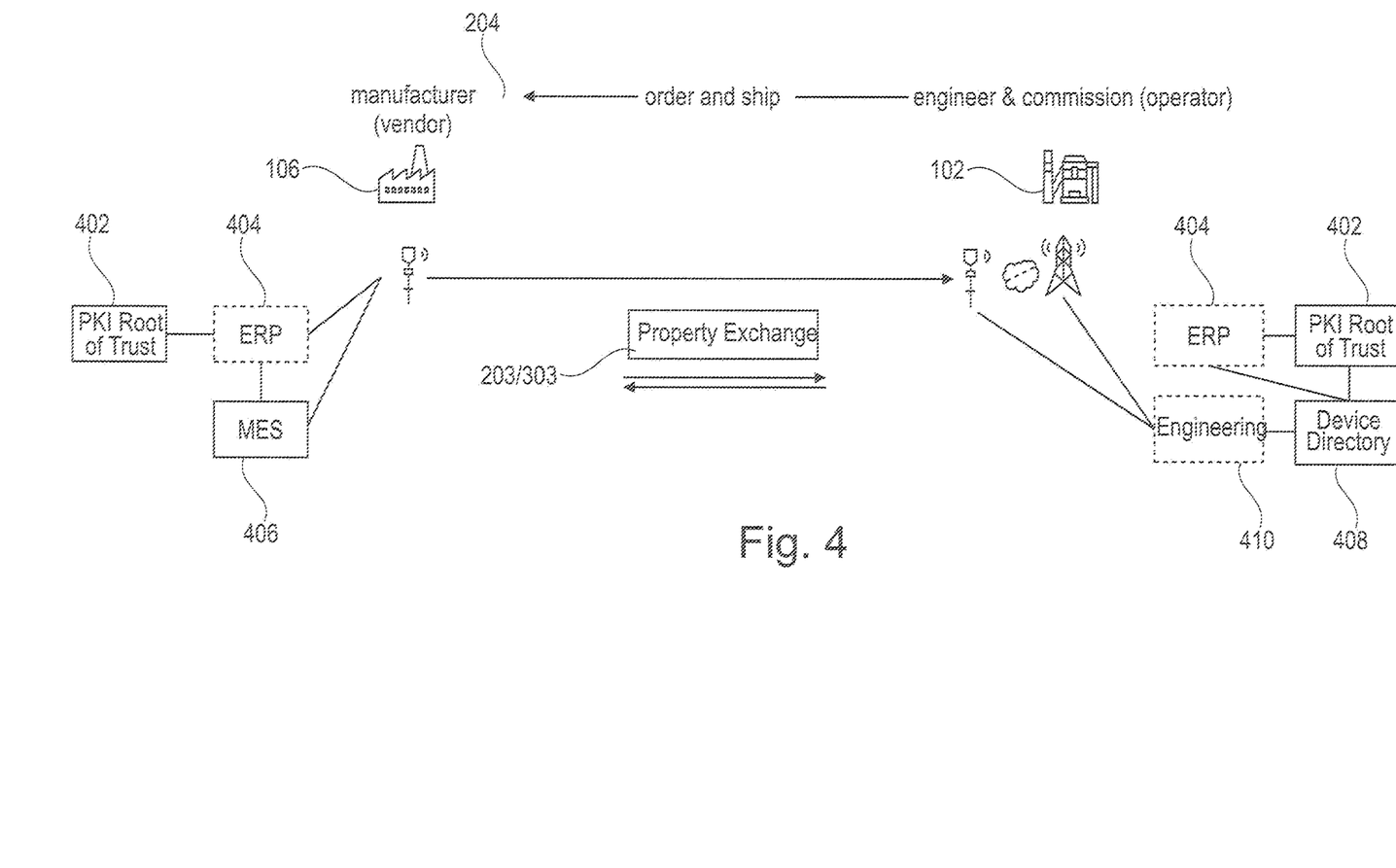
FIG. 4 is a diagram of a two-party data exchange scenario with direct on-boarding in accordance with the disclosure.

The methods described so far relate to a two-party data exchange scenario with direct on-boarding, which is illustrated in more detail in FIG. 4. As shown, the device directory 408 (e.g., the on-boarding identities database 201) of the operator 102 is communicatively coupled to an enterprise resource planning (ERP) system 404 configured to submit orders for example using SAP or by email. Similarly, an ERP system 404 at the vendor 106 is communicatively coupled to a manufacturing execution system (MES) 406. In this way, the ERP systems are communicatively coupled to exchange order data comprising the container with the secured security credentials. This communicative coupling may be further extended to include subcontractors or other value-chain partners alongside the operator 102 and vendor 106. The PKI Root of Trust 402 is the corporate certificate authority used in the plant operator domain, which generates and/or signs certificates for the other tools 404-410, allowing them to create authenticated data by trusting the certificate authority. During ordering, the vendor 106 may reference the certificate authority to verify that the contained security credentials are authentic. Furthermore, credential values, e.g. in case of 802.1AR or 5G-TLS, are signed and/or generated by the PKI Root of Trust 402 (or via any of the attached tools 404-410), allowing a device to be verified as belonging to the plant 118. The engineering tool 410 handles device engineering data (parameters) and stores them in the device directory 408.

Figure 5:
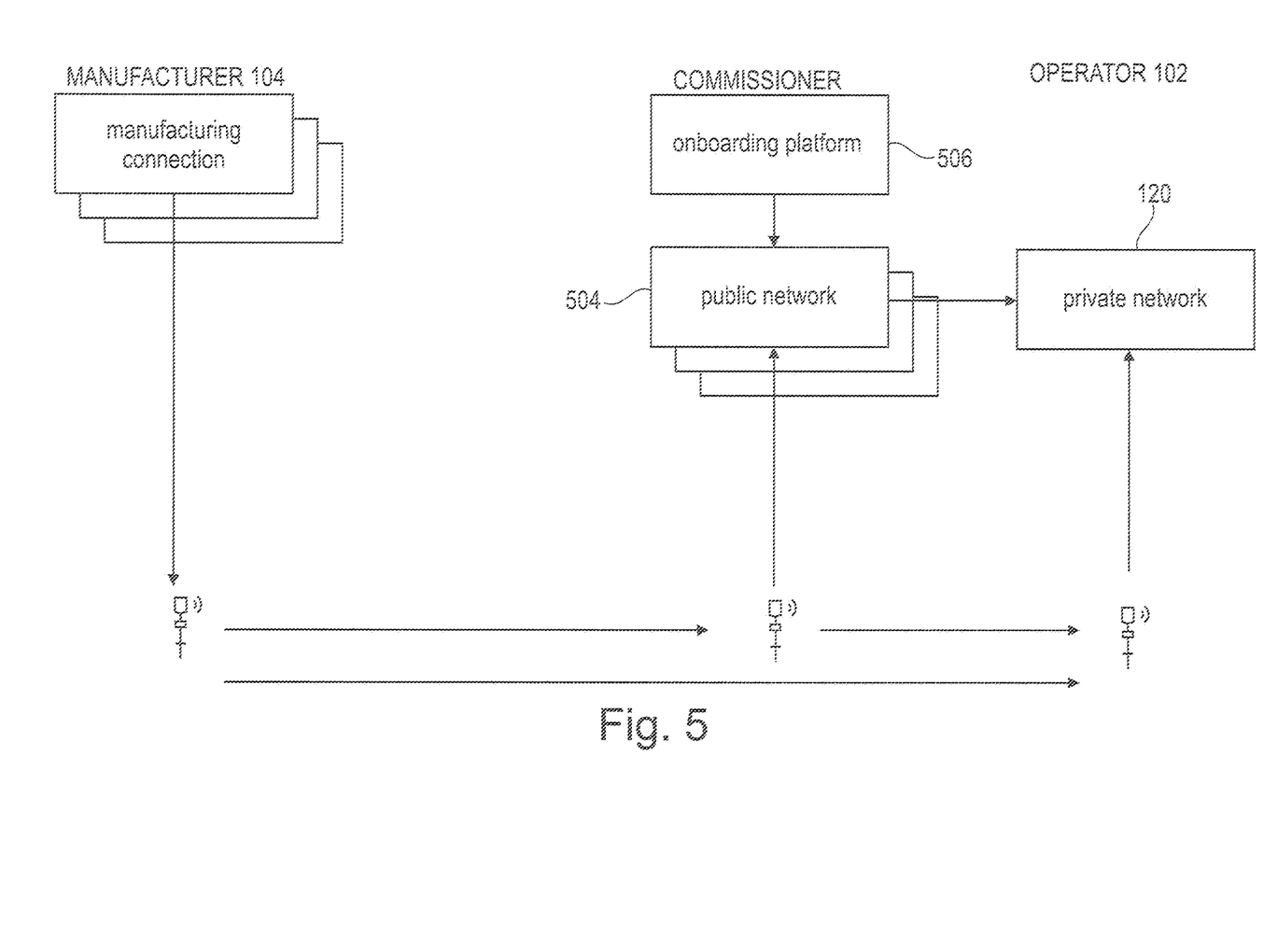
FIG. 5 is a diagram of a three-party data exchange scenario with intermediate on-boarding in accordance with the disclosure.

FIG. 5 illustrates a three-party data exchange scenario with intermediate on-boarding. Particularly for cellular devices, an intermediate on-boarding platform 506 may be used, which provides identities to the manufacturer 104 based on a service contract with the operator 102. In such a scenario, the device is first admitted to the on-boarding platform 506. The operator 102 then uses their platform account to download the security credentials for the device. In one variant, the plant operator 102 downloads pre-existing security credentials from the platform 506, while the 3rd party platform serves as the root of trust for the device identity. In another variant, the plant operator uploads the security credentials via the platform and the illustrated network connection to the device (e.g. using its eSIM). The operator 102 triggers a network reattachment and device admission to the plant network 120 takes place. The on-boarding platform 506 may be communicatively coupled with both the manufacturer 104 and with the operator 102 (for example with the device management system of the industrial automation system), which allows credentials to be exchanged with the platform 506 for pre-parameterizing the manufactured device. During device commissioning, the device enters the commissioning network/access point in areas where a mobile operator is platform partner. This is one of the many public networks in the world, e.g. a dedicated access point (APN). The device management system or a human operator can connect to the on-boarding platform 506 using pre-provided credentials and reconfigure the device service profile to move it to the plant-assigned private network 120. Using the intermediate on-boarding platform 506 means that the operator 102 only needs to interact with one partner system that is securely coupled.

Figure 6:
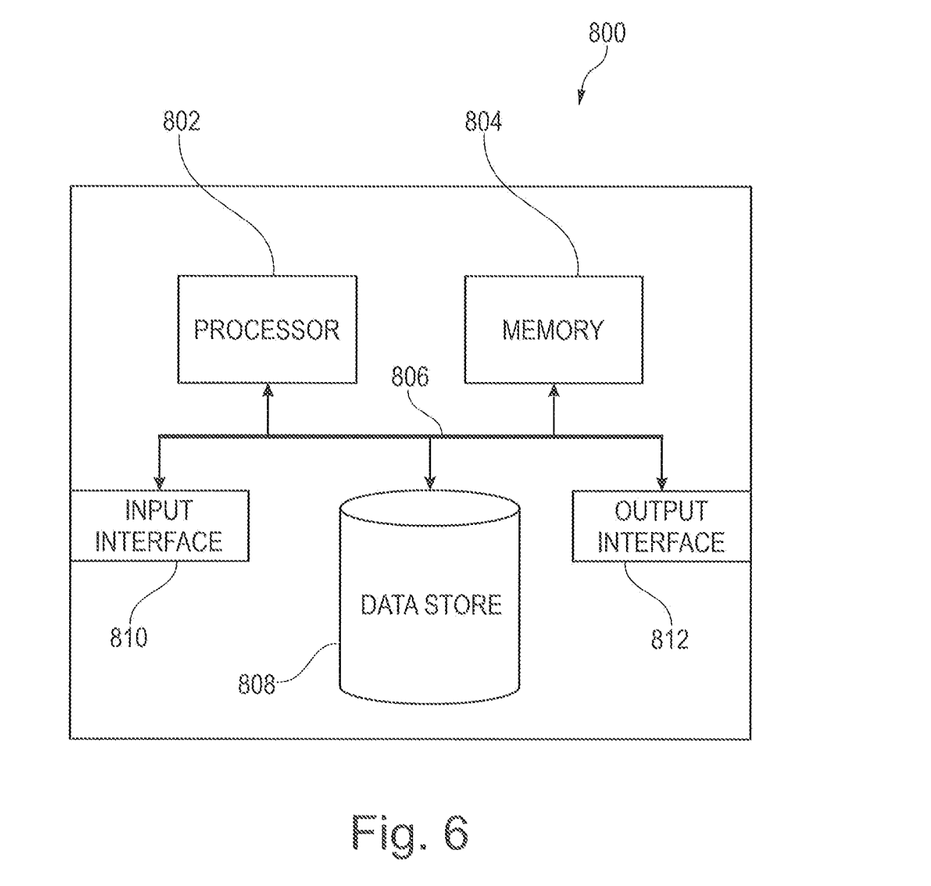
FIG. 6 is a block diagram of a computing device that can be used in accordance with the systems and methods disclosed herein, in accordance with the disclosure.

Referring now to FIG. 6, a high-level illustration of an exemplary computing device 800 that can be used in accordance with the systems and methodologies disclosed herein is illustrated. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store conversational inputs, scores assigned to the conversational inputs, etc.

The computing device 800 additionally includes a data store 808 that is accessible by the processor 802 by way of the system bus 806. The data store 808 may include executable instructions, log data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media include computer-readable storage media. Computer-readable storage media can be any available storage media that can be accessed by a computer. By way of example, and not limitation, such computer-readable storage media can comprise FLASH storage media, RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It will be appreciated that the aforementioned circuitry may have other functions in addition to the mentioned functions, and that these functions may be performed by the same circuit.

Each individual feature described herein, and any combination of two or more such features, are disclosed in isolation herein to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. Aspects of the present invention may consist of any such individual feature or combination of features.

It has to be noted that embodiments of the invention are described with reference to different categories. In particular, some examples are described with reference to methods whereas others are described with reference to apparatus. However, a person skilled in the art will gather from the description that, unless otherwise notified, in addition to any combination of features belonging to one category, also any combination between features relating to different category is considered to be disclosed by this application. However, all features can be combined to provide synergetic effects that are more than the simple summation of the features.

While the subject matter of the disclosure and exemplary embodiments have been illustrated and described in detail in the drawings and foregoing description, such illustration and description are to be considered exemplary and not restrictive. The invention is not limited to the disclosed embodiments. Other variations to the disclosed embodiments can be understood and effected by those skilled in the art, from a study of the drawings, the disclosure, and the appended claims.

The word "comprising" does not exclude other elements or steps.

The indefinite article "a" or "an" does not exclude a plurality. In addition, the articles "a" and "an" as used herein should generally be construed to mean "one or more" unless specified otherwise or clear from the context to be directed to a singular form.

A single processor or other unit may fulfil the functions of several items recited in the claims.

The mere fact that certain measures are recited in mutually different dependent claims does not indicate that a combination of these measures cannot be used advantageously.

A computer program may be stored/distributed on a suitable medium, such as an optical storage medium or a solid-state medium supplied together with or as part of other hardware, but may also be distributed in other forms, such as via the internet or other wired or wireless communications systems.

Any reference signs in the claims should not be construed as limiting the scope.

Unless specified otherwise, or clear from the context, the phrases "one or more of A, B and C", "at least one of A, B, and C", and "A, B and/or C" as used herein are intended to mean all possible permutations of one or more of the listed items. That is, the phrase "X comprises A and/or B" is satisfied by any of the following instances: X comprises A; X comprises B; or X comprises both A and B.

In one particular example, referred to herein as on-order configuration, supplying the second party with the container comprises generating and storing the container in a secure work environment, e.g. on a private network, encrypting the primary security credential using a pre-provided key, before transmitting the container comprising the encrypted primary security credential over a public network to the second party's private network, from which the container is downloaded to the device. The device then decrypts the primary security credential using at least one pre-provided key. In this example, the first party may be the operator of the industrial automation system, and the first party's secure work environment may comprise at least part of the industrial automation system, e.g. an engineering tool for said system. The second party may be the manufacturer of the device, and the manufacturer's private network may comprise, or be connected to, at least part of a manufacturing system operated by the manufacturer, for example a manufacturing execution system (MES).

In another particular example, referred to herein as post-order configuration, the first party establishes a secure channel over a public network to access the second party's private network and to generate and/or store the container thereon. The device then establishes a further such secure channel to the second party's private network, e.g. using pre-provided login data, and downloads the container over the further secure channel.

The container may comprise a security sub model into which the primary security credential is integrated. The secondary security credential described herein may also be integrated into the said security sub model, or into the security sub model of a further such container. In one example, the container comprises multiple security sub models for different communication layers (e.g. a OPC 10000-21 device identity ticket for OPC UA, IEEE 802.1AR for 5G EAP-TLS, 5G-AKA or LTE symmetric keys and so on). The primary security credential may be encrypted by encrypting the security sub model that contains it. The container may further comprise a device configuration sub model, which may comprise device parameters, i.e. functional data and/or other non-sensitive configuration data for the device. The device configuration sub model may or may not be kept confidential.

Once the device has been parameterized, the method of any of the aforesaid aspects may further comprise commissioning the device for use in the industrial automation system, wherein the commissioning comprises the device using the primary security credential to establish trust with the industrial automation system. The method may further comprise operating the industrial automation system comprising the parameterized and commissioned device.

According to a fifth aspect, there is provided a method of operating an industrial automation system comprising a device parameterized and commissioned as described herein. Commissioning (or 'on-boarding') the device may comprise powering it up, connecting it to the industrial automation system, and authenticating the device using the primary security credential. Commissioning or on-boarding of the device may comprise direct on-boarding or intermediate on-boarding, i.e., in a two-party data exchange scenario or in a three-party data exchange scenario. Direct on-boarding comprises on-boarding the device directly onto the final plant network. Intermediate on-boarding may comprise on-boarding the device onto an intermediate platform which has its own secure channel to the plant and/or to the device manufacturer. Those secure channels may be implemented using the methods described herein.

In some examples, the methods described herein may be carried out as part of a bulk ordering process or a bulk provisioning process for multiple devices.

Any of the methods described herein may further comprise signing third party identities from an external network operation environment to bestow trust upon them for the ordering process. For example, when using a third party on-boarding platform, that platform could participate in the credentials exchange process as described herein. Additionally, in the case in which the first party wants to delegate certain steps to a third party, this would include bringing their identities into the trust model.

By "device" is meant any device which is expected to communicate with the industrial automation system or parts of it, in particular where there is a need for the device to establish trust with the industrial automation system. The device may be field device or a control device for the industrial automation system, for example.

As used herein, "parameterization" relates to providing the device with data such as configuration data and may also be referred to as provisioning or configuration.

By "device parameters" or "configuration data" is meant that data which, when provided to the device, transforms the device from a manufactured or default state to an operational state. The configuration data may comprise functional data and/or security data.

The term "functional data" relates to the operation of the device within the industrial automation system. Functional data may or may not be kept confidential.

The terms "security data", "security-sensitive data", or "security credential" as used herein refer to any data which is to be kept confidential and in particular to that data, i.e. the primary security credential, which is to be used by the device for establishing trust with the industrial automation system. The security credentials may comprise one or more on-boarding credentials. The security credentials may comprise one or more of: a device identity, whether a permanent identity or at least initial identity information; cryptographic material, for example at least one cryptographic key, for example a symmetric or asymmetric key, e.g. 5G-AKA authentication; one or more shared secrets (e.g. using 5G-AKA) to be exchanged between the parties in some way; a device certificate. In some examples, at least the assignment of the device identity should form a secure part of the process.

By "identity" is meant any data that can identify the device and/or its role in the industrial process or which can be automatically mapped to the device role. For example, the identity may comprise a plant-specific tag name indicating the device role in the process. The identity may comprise one or more secure identities based for example on IEEE 802.1AR, OPC UA, OPC 10000-21, 5G EAP-TLS, 5G-AKA. The device identity may comprise a permanent device identity. Additionally or alternatively, the device identity may comprise at least one temporary or initial identity. In some examples, various security credentials for network and application layers are derived from a common secure device identity, e.g. based on IEEE 802.1AR, e.g.

running OPC UA as the application layer protocol and operating transport networks from the automation domain using e.g. IEEE 802.1X/EAP-TLS or 5G EAP-TLS for authentication. In other examples, various security credentials for network and application layers use different secure device identities (but not necessarily different identity standards), for example when using a 5G network with SIM-card management performed by the network operator.

As used herein, the "container" may comprise a data package or data artefact which is standardized in the field of industrial automation for the exchange of device configuration data, for example an AASX packet. The container may conform to a standardized device property exchange format, such as Asset Administration Shell (AAS). According to the present disclosure, the container may be used to transfer cryptographic material for secure data exchange between the device and the industrial automation system.

The terms "encryption" and "decryption" and the like as used herein may refer to the use of any suitable cryptosystem, whether symmetric or asymmetric, for example authenticated encryption with associated data (AEAD); Advanced Encryption Standard (AES); public-key cryptography, for example RSA (Rivest-Shamir-Adleman) or ECC (elliptic-curve cryptography); or any combination thereof.

As used herein, the term "secure channel" refers to the use of any means of secure communication to ensure, or at least facilitate, confidentiality. A secure channel may be established for example by using encryption, one or more secure protocols (e.g. HTTPS), access control using e.g. login credentials, or any combination thereof.

By "public network" is meant any unsecured, publicly-accessible network such as the internet. Correspondingly, "private network" as used herein refers to a network which is secure or not publicly accessible. Any network as described herein may comprise one or more IP-converged automation networks, IT/telecom technologies such as IEEE TSN or 3GPP 5G, or open automation architectures like OPAF or NOA.

The terms "module," "system," "circuitry," or "tool" may be used herein interchangeably.

By exchanging the primary security credential along with other device data by way of a machine-readable standardized container for engineering data, the claimed subject-matter allows plant operators and vendors to exchange security-sensitive data end-to-end over public networks in a secure manner using standardized and gapless exchange mechanisms. In turn, the claimed subject-matter may provide for automated and gapless zero-touch provisioning without human intervention. The mechanisms described herein may yield secure ways to transfer technology-specific security data over public communication channels, while providing for a finer-grain authentication and a level of access control not otherwise possible. By "gapless", end-to-end" or "seamless" is meant that communication is possible between the computing systems of the first party (such as an engineering tool for configuring field devices or an enterprise resource planning (ERP)) and those of the second party (such as an ERP system and/or a manufacturing execution system (MES)), all of which are able to read the container, without human involvement in the communication.

Presuming that exchange formats such as the Industrie 4.0 AAS will be used as standardized and common-practice ways to transfer device property data, the solutions described herein avoid the prohibitive variety of vendor- and technology-specific exchange solutions, while complying with zero-trust principles, such as minimal information exposure. This creates the basis for trusted self-configuration or secure on-boarding in a plug-and-play fashion in industrial automation systems. For example, once installed and powered up, devices can be automatically identified, authenticated, and admitted by the system's network access control (e.g. based on 3GPP 5G or IEEE 802.1X) and application layer (e.g. OPC UA Part 2, draft 21). The solutions described herein may leverage security features of the AAS to facilitate end-to-end secure transfer of secrets between the manufacturer and operator. AAS access can be online/live or offline via AAS transfer. Security credentials can be provided for a device with full transparency of its life-cycle status, i.e. it does not matter whether the device is only engineered, ordered, manufactured, or already commissioned. The AAS model is leveraged for easy configuration of even unusual security parameters. For example, post-quantum crypto parameters may be automatically usable due to the corresponding AAS representation without adjusting ordering process or customer communication.

Post-order configuration as described herein enables the use of online-access to the AAS to create an infrastructure-agnostic configuration interface for a device. This configuration interface may be used regardless of where the AAS is hosted, whether it is used online or through file transfer.

Advantageously, the claimed subject-matter may be used in conjunction with cellular security systems in which permanent identities are never to be exposed over open channels, not to mention shared secrets.

According to a sixth aspect, there is provided a computing device comprising a processor configured to perform the method of any of the first-fifth aspects.

According to a seventh aspect, there is provided a computer program product comprising instructions which, when executed by a computing device, enable or cause the computing device to perform the method of any of the first-fifth aspects.

According to an eighth aspect, there is provided a computer-readable medium comprising instructions which, when executed by a computing device, enable or cause the computing device to perform the method of any of the first-fifth aspects.

The invention may include one or more aspects, examples or features in isolation or combination whether or not specifically disclosed in that combination or in isolation. Any optional feature or sub-aspect of one of the above aspects applies as appropriate to any of the other aspects.

These and other aspects of the invention will be apparent from and elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for securely supplying data to be used in parameterizing a device for an industrial automation system, the method comprising:
   a first party supplying a second party with a machine-readable standardized container for the exchange of device parameters in industrial automation systems, wherein the supplying comprises writing into the container an encrypted primary security credential to be used by the device for establishing trust with the industrial automation system, wherein the machine-readable standardized container supplied by the first party or obtained by the second party comprises further device parameters for parameterizing the device, wherein parameterizing the device comprises extracting, by the device, the encrypted primary security credential and decrypting the encrypted primary security credential, wherein the machine-readable standardized container comprises configuration data including functional data for parametrizing the device, the machine-readable standardized container comprising a device configuration sub model and an encrypted security sub model, wherein the configuration data is stored in the device configuration sub model that is integrated in the machine-readable standardized container, the primary security credential being integrated into the encrypted security sub model.

2. A method for securely obtaining data to be used in parameterizing a device for an industrial automation system, the method comprising:
   obtaining, from a first party, by a second party, a machine-readable standardized container for the exchange of device properties in industrial automation systems, the container comprising an encrypted primary security credential to be used by the device for establishing trust with the industrial automation system, wherein the machine-readable standardized container supplied by the first party or obtained by the second party comprises further device parameters for parameterizing the device, wherein parameterizing the device comprises extracting, by the device, the encrypted primary security credential and decrypting the encrypted primary security credential, wherein the machine-readable standardized container comprises configuration data including functional data for parametrizing the device, the machine-readable standardized container comprising a device configuration sub model and an encrypted security sub model, wherein the configuration data is stored in the device configuration sub model that is integrated in the machine-readable standardized container, the primary security credential being integrated into the encrypted security sub model.

3. The method of claim 1, wherein the first party writes the primary security credential into the container using a secure local work environment, before supplying the second party with the container by transmitting the container to the second party over a public or private network.

4. The method of claim 1, wherein the first party writes the primary security credential into the container by using a secondary security credential received from the second party to establish a secure channel to a remote work environment of the second party in which the container is stored, before writing the primary security credential into the container stored in the remote work environment.

5. The method of claim 4, wherein the secondary security credential is transmitted from the second party to the first party by embedding it in the said container and transmitting the container.

6. The method of claim 1, further comprising commissioning the parameterized device for use in the industrial automation system, wherein the commissioning comprises the device using the primary security credential to establish trust with the industrial automation system.

7. A method for parameterizing a device for an industrial automation system, the method comprising:
    obtaining a machine-readable standardized container for the exchange of device properties in industrial automation systems, the container comprising an encrypted primary security credential to be used by the device for establishing trust with the industrial automation system, along with further device parameters for parameterizing the device; and
    parameterizing the device using the device parameters from the container, wherein the parameterizing comprises the device extracting the primary security credential from the container and decrypting the primary security credential, wherein the machine-readable standardized container comprises configuration data including functional data for parametrizing the device, the machine-readable standardized container comprising a device configuration sub model and an encrypted security sub model, wherein the configuration data is stored in the device configuration sub model that is integrated in the machine-readable standardized container, the primary security credential being integrated into the encrypted security sub model.

8. The method of claim 7, wherein the parameterizing is performed locally by downloading the container to the device from a secure local work environment in which the container is stored.

9. The method of claim 7, wherein the parameterizing is performed remotely by accessing a remote work environment in which the container is stored, and downloading the container to the device from the remote work environment.

10. The method of claim 9, wherein the device itself accesses the remote work environment according to predefined power-on behavior programmed into the device.

11. The method of claim 10, wherein the predefined power-on behavior is input to the device by way of the said container.

12. The method of claim 7, further comprising commissioning the parameterized device for use in the industrial automation system, wherein the commissioning comprises the device using the primary security credential to establish trust with the industrial automation system.

* * * * *